(12) United States Patent
DeRosa-Grund

(10) Patent No.: US 11,507,948 B2
(45) Date of Patent: Nov. 22, 2022

(54) BLOCKCHAIN ARCHITECTURE, SYSTEM, METHOD AND DEVICE FOR AUTOMATED CYBERSECURITY AND DATA PRIVACY LAW COMPLIANCE WITH DELAYED BLOCK POSTING PROTOCOL

(71) Applicant: H. Anthony DeRosa-Grund, Magnolia, TX (US)

(72) Inventor: H. Anthony DeRosa-Grund, Magnolia, TX (US)

(73) Assignee: Atrium Separate IP Holdings Number 4, LLC, Sheridan, WY (US)

( * ) Notice: Subject to any disclaimer, the term of this patent is extended or adjusted under 35 U.S.C. 154(b) by 337 days.

(21) Appl. No.: 16/855,918

(22) Filed: Apr. 22, 2020

(65) Prior Publication Data
US 2020/0334379 A1 Oct. 22, 2020

Related U.S. Application Data

(60) Provisional application No. 62/982,517, filed on Feb. 27, 2020, provisional application No. 62/902,456, filed on Sep. 19, 2019, provisional application No. 62/837,117, filed on Apr. 22, 2019.

(51) Int. Cl.
| | | |
|---|---|---|
| *H04L 9/00* | (2022.01) | |
| *G06Q 20/38* | (2012.01) | |
| *G06F 21/62* | (2013.01) | |
| *H04L 9/06* | (2006.01) | |
| *H04L 9/08* | (2006.01) | |

(52) U.S. Cl.
CPC ....... *G06Q 20/389* (2013.01); *G06F 21/6245* (2013.01); *H04L 9/0637* (2013.01); *H04L 9/0819* (2013.01); *H04L 9/0894* (2013.01); *G06F 2221/2111* (2013.01); *G06Q 2220/00* (2013.01); *H04L 9/50* (2022.05); *H04L 2209/56* (2013.01)

(58) Field of Classification Search
CPC . G06F 21/6245; G06F 2221/2111; H04L 9/50
See application file for complete search history.

(56) References Cited

U.S. PATENT DOCUMENTS

| | | | |
|---|---|---|---|
| 10,521,780 B1 | 12/2019 | Hopkins, III | |
| 11,049,128 B1 | 6/2021 | Olson | |
| 2017/0352012 A1* | 12/2017 | Hearn | G06Q 20/3829 |
| 2018/0323963 A1* | 11/2018 | Stollman | G06F 16/86 |
| 2019/0026821 A1 | 1/2019 | Bathen | |
| 2019/0034975 A1 | 1/2019 | Rizk | |
| 2019/0130416 A1* | 5/2019 | Boudville | G06Q 20/1085 |
| 2019/0220603 A1* | 7/2019 | Gopalakrishnan | G06F 21/64 |
| 2019/0251527 A1* | 8/2019 | Surdak | G06Q 20/3674 |
| 2019/0340623 A1 | 11/2019 | Rivkind | |
| 2019/0363890 A1* | 11/2019 | Johnson | G06Q 20/02 |

(Continued)

*Primary Examiner* — Eric W Shepperd
(74) *Attorney, Agent, or Firm* — Haverstock & Owens, A Law Corporation

(57) ABSTRACT

A distributed transaction and data storage platform including a distributed notary ledger or blockchain and one or more individual user micro-identifier chains that together enable the secure effectuation and recordation of one or more transactions, and/or storage of data in an automated, real-time, zero-trust, globally data law and privacy law centric manner while maintaining transaction party confidentiality and preventing chain poisoning.

31 Claims, 3 Drawing Sheets

(56) References Cited

U.S. PATENT DOCUMENTS

| | | |
|---|---|---|
| 2019/0370866 A1 | 12/2019 | Lawbaugh |
| 2020/0051041 A1 | 2/2020 | Ko |
| 2020/0058023 A1 | 2/2020 | Travizano |
| 2020/0065922 A1 | 2/2020 | Goldstraj |
| 2020/0175003 A1 | 6/2020 | Jiang |
| 2020/0186962 A1* | 6/2020 | Moeller ................ H04L 9/3226 |
| 2020/0210413 A1* | 7/2020 | Quick ................. G06F 16/9024 |
| 2020/0242595 A1* | 7/2020 | Harrison ............. H04L 67/1097 |
| 2020/0267163 A1* | 8/2020 | Wilson .................. G06F 16/907 |
| 2020/0320220 A1* | 10/2020 | Beno .................... H04L 9/3247 |
| 2021/0049608 A1 | 2/2021 | Yang |
| 2021/0182423 A1* | 6/2021 | Padmanabhan ..... G06F 21/6245 |
| 2022/0123945 A1* | 4/2022 | Yang .................. G06F 21/6254 |

\* cited by examiner

BLOCKCHAIN ARCHITECTURE, SYSTEM, METHOD AND DEVICE FOR AUTOMATED CYBERSECURITY AND DATA PRIVACY LAW COMPLIANCE WITH DELAYED BLOCK POSTING PROTOCOL

RELATED APPLICATIONS

This patent application claims priority under 35 U.S.C. § 119(e) of the U.S. Provisional Patent Application No. 62/837,117, filed Apr. 22, 2019, entitled "PTX LAB'S PTX-ACPSS CHAIN, A THIRD VARIANT OF THE ORIGINAL PTX CHAIN THAT EMPLOYS A PROPRIETARY DELATED BLOCK POSTING PROTOCOL ("DBPP") TO PREVENT THE POSSIBILITY OF BLOCKCHAIN "CHAIN POISONING," U.S. Provisional Patent Application No. 62/902,456, filed Sep. 19, 2019, entitled "ENTERPRISE GRADE DATABASE AND TRANSACTION PLATFORM WITH CONTINUOUS, AUTOMATED WORLDWIDE DATA PRIVACY LAW COMPLIANCE," and U.S. Provisional Patent Application No. 62/982,517, filed Feb. 27, 2020, entitled "ENTERPRISE GRADE DISTRIBUTED DATA STORAGE AND TRANSACTION PLATFORM WITH CONTINUOUS, AUTOMATED WORLDWIDE DATA PRIVACY LAW AND REGULATORY LAW COMPLIANCE, IMPERVIOUS TO CYBER ATTACKS AND UTILIZING AN AI/MACHINE LEARNING BIOMETRIC SECURITY LOCK WITH A PROOF OF LIVENESS TEST FOR ID AND ACCESS," all of which are hereby incorporated by reference.

FIELD OF THE INVENTION

The present invention relates to the field of distributed ledger and blockchain systems. More particularly, the present invention relates to a plurality of interoperating distributed ledger and blockchain systems for enabling distributed data storage and distributed secure transactions and preventing chain poisoning while being globally and autonomously data privacy law and regulatory law compliant in a zero-trust manner.

BACKGROUND OF THE INVENTION

Blockchain was the first fully functional distributed ledger technology. However, deployed blockchains are plagued with problems that limit, and inhibit, its vast potential. These include inability to scale, limit to the number of transactions per second, security vulnerabilities, inefficiency, and costly and problematic consensus mechanisms. Additionally, they are by their very nature unable to be compliant with international data privacy laws, including, but not limited to the GDPR and CCPA.

Moreover, blockchains are particularly susceptible to chain poisoning. Chain poisoning comes in two forms: privacy poisoning (which uses any individuals' Private Personal Information) or data poisoning (uses improper/illegal data i.e., a copyrighted song or clip of child pornography). All any person needs to do, to permanently "poison" a blockchain, is to embed just one single piece of personal information (Privacy Poisoning) or illegal improper data (Data Poisoning) into a transaction that is then put into a blockchain block. Once that poisoned block, containing that personal information or unlawful data is in turn posted a blockchain chain, that entire chain becomes poisoned as well. That result is that the chain is fully incapacitated as the poisoning immediately renders that entire chain unlawful/illegal under various international laws (i.e., data privacy, copyright, child pornography, etc.). Further, blockchain's immutability makes chain poisoning irreversible. There is no "antidote" once a blockchain has been discovered to have been chain poisoned. The "purging" of a chain after the posting of such poisoned blocks is near impossible, as blockchain's immutability prevents any blocks (poisoned or otherwise) from ever being erased, deleted or modified. Indeed, even if a blockchain is able to be remediated, all current chains have no offensive or defensive systems to prevent that chain from being immediately re-infected all over again.

SUMMARY OF THE INVENTION

A transaction platform including a notary distributed ledger or blockchain and one or more separate micro-identifier chains (MIDCs) that together enable the secure effectuation and recordation of one or more transactions and storage of data in an automated privacy and regulatory law compliant manner (with or without zero-trust) while maintaining transaction party confidentiality and preventing chain poisoning. The notary distributed ledgers or blockchains, as well as the MIDC's are able to use single transaction blocks to store, maintain and provide information about the parties related to the transactions which the blockchain is able to utilize in order to securely and quickly validate, execute and record the transactions. The single transaction blocks and distributed ledger, transaction and data store thereof is able to function as a public or private blockchain (e.g. a distributed blockchain or database across a plurality of computing devices that each store copies of transactions in one or more linked blocks, in this case single transaction blocks) that maintains a continuously-growing list of data records hardened against tampering and revision. In particular, unlike other blockchains where a single block is used to store thousands of transactions, the single transaction blockchain of this system is able to consist of data structure blocks with each block holding only one individual transaction, piece of data (e.g., document, audio file, video file, biometric characteristics, or other types of data) and/or the results of any blockchain executables. Each single transaction block of the blockchain is able to comprise a timestamp and information linking it to a previous block thereby defining the chain and maintaining an order of each of the records/transactions.

The native user data, as well as Private Personal Information (PPI) for each user is able to be stored on the micro-identifier chain. A plurality of MIDCs can be combined to form a micro-identifier chain arrays for the transaction platform. In some embodiments, MIDC stacked on top of each other look like a database in that they have rows, and columns. The single transaction blocks in each MIDC are the equivalent of cells in a database. This totality of these stacked MIDC combine together to form the distributed storage equivalent of a database that we call a Chain Arrayed Data Store. This Chained Arrayed Data Store and single transaction block ("STB") allow the system to emulate the CRUD (Create, Read, Update and Delete) of a database. As such it allows the system to be the only blockchain capable of modifying and or deleting data in such a manner not to compromise the integrity and immutability of the chain itself. As such it is the first blockchain that can solve the "Blockchain Paradox"—other existing blockchains inability to delete data once place on a blockchain, rendering said chain in perpetual violation of global data privacy laws that contain recitals of right of erasure or "Right to Be Forgotten." In such embodiments, for each user, only a specified single transaction block ("STB") of their micro-identification chain that stores de-identified user data is able to be accessed by the notary blockchain(s) in order to form on-chain transactions. The data stored on the notary chain(s), and the other single transaction blocks of that chain and the micro-identification chain(s) is kept secure from any intruders.

In some embodiments, the transaction platform enables the prevention of blockchain poisoning by preventing direct posting to the main blockchain by users (e.g. no posting of native user data from a MIDC side chain to the main chain), by employing a delayed posting protocol wherein artificial intelligence and/or machine learning assisted potential block scanning for privacy or data poisoning while still in a pre-posting posture (where each block only contains a single transaction and thus deletion/prevention does not affect posted non-poisoned transactions), and by enabling deletion of discovered poisoned blocks and/or if necessary an entire MIDC of the associated malicious user thereby leaving all other user MIDC's and the notary chain(s) intact.

In some embodiments, the platform utilizes a delegated proof of transaction consensus method that enables the transaction to be recorded in near real-time by assuming the "buyer" and "seller" are known "good" actors before consensus has been determined and corrected afterwards in the case of rightfully disputed transactions. In some embodiments, the transaction platform provides an off-chain database management system, that complies with General Data Protection Regulation (GDPR), California Consumer Privacy act (CCPA) and other data privacy laws, by only utilizing de-identified, encrypted, pseudoanonymized and fully anonymized user data to record transactions while securely storing the native user data separate from the transaction ledgers/blockchains such that erasure is able to be effectuated upon demand by the removal of the stored native user data thereby anonymizing the data recorded on the blocks having the associated transactions. This is done in a manner so not to compromise the very immutability of those blockchains.

A first aspect is directed to a privacy law compliant blockchain transaction platform for recording transactions between a plurality of users having accounts, assigned unique identifiers and assigned public and private digital key pairs and or ephemeral keys on the platform. The platform comprises a micro-identification blockchain array formed by a stack of a plurality of micro-identification blockchains, wherein each one of the micro-identification blockchains is dedicated to a single one of the users such that the one of the micro-identification blockchains stores a native identifier of one of the users, a coded identifier of the one of the users and a set of personal information about the one of the users, a notary blockchain that includes separate single transaction blocks storing details of each transaction between any two or more of the users and a non-transitory computer-readable medium storing at least one blockchain transaction platform operating system including a micro-identification chain engine, an automated data privacy and regulatory law compliance engine and a notary blockchain engine, the micro-identification engine configured to receive a transaction request from a user device, the transaction request identifying a pending transaction object between a group of the users, wherein the pending transaction object is digitally signed by the private digital key of each user of the group, generate and post the pending transaction object as a pending transaction block on the micro-identification chain of each user of the group of the users and transmit the pending transaction object to the notary engine, the notary blockchain engine configured to attempt to facilitate execution of terms of a transaction identified by the pending transaction object including a transfer of funds between the group of the users, if the attempt is successful, generate and post a transaction-completed block on the notary blockchain indicating that the transaction identified by the pending transaction object is completed and transmit copies of the transaction-completed block, or hash values pointing to the notary chain block for said transaction to the micro-identification blockchain and if the attempt is unsuccessful, generate a transaction-failed block indicating that the transaction identified by the pending transaction object could not be completed and transmit copies of the transaction-failed block, or hash value for same pointing to the notary chain for said block to the micro-identification engine, wherein the micro-identification engine is configured to post the transaction completed blocks and the transaction-failed blocks on the micro-identification blockchains of each of the group of the users upon receipt from the notary blockchain engine.

In some embodiments, the micro-identification engine generates each of the micro-identification blockchains by generating a first block of the micro-identification blockchain including the native identifier, the encoded identifier and the set of personal information, encrypting the encoded identifier and the set of personal information and generating and appending a second block to the first block, the second block including the encoded identifier and the set of personal information as encrypted. In some embodiments, the notary engine is able to access blocks of the micro-identification blockchains including the encoded identifier and the set of personal information as encrypted, but restricted from accessing any blocks of the micro-identification chains that include the native identifier. In some embodiments, the micro-identification array is logically organized such that each of the micro-identification chains form a logical row and an initial block of each of the stack of the micro-identification blockchains form a logical first column and each subsequent block of each of the stack of the micro-identification blockchains form logical subsequent columns.

In some embodiments, the transaction platform operating system includes a database import module configured to import a database having stacked rows of cells of data by converting each row of the database into a new logical row of the array formed by a new micro-identification blockchain with each cell of the row of the database forming a new block of the new micro-identification blockchain. In some embodiments, the transaction platform operating system includes a data privacy compliance engine configured to identify a geographic location of each one of the users when the users registered with the platform and each time the users initiate a transaction on the platform, determine a set of stored geo-location specific data privacy rules that apply to the geographic location and apply the set of data privacy rules to data added to the micro-identification blockchain of the one of the users. The same is able to be applied to geo-located transactions and users to automatically apply the appropriate geographic centric regulatory laws as well. In some embodiments, in response to the one of the users selecting a right of erasure command, the data privacy compliance engine is configured to delete the micro-identification blockchain of the one of the users. The rules for said erasure are able to be based on the specific geolocation of the user and applied by the systems autonomous, real-time, zero-trust data privacy law and regulatory law compliance engine. In some embodiments, in response to the one of the users selecting a right of erasure command, the data privacy compliance engine is configured to store a time that the command was received, determine an applicable set of the set of stored geo-location specific data privacy rules that apply to the one of the users and if the applicable set includes an erasure delay period, delete the micro-identification blockchain of the one of the users (i.e. the user making the erasure request) if the applicable set does not include the erasure delay period and refrain from deleting the micro-identification blockchain of the one of the users at the time that the command was received for the erasure delay period and deleting the micro-identification blockchain of the one of the users after the erasure delay period has expired if the applicable set includes the erasure delay period.

In some embodiments, the operating system includes an anti-poisoning module that determines if the pending transaction object to be posted includes illegal, malicious, cybersecurity compromising, hacking, phishing, malware or ransomware, type content and prevents posting of the pending transaction block if the pending transaction object includes the content. In some embodiments, the private digital keys are not stored on the platform and dynamically regenerated by a key module of the operating system upon request by one of the users. In some embodiments the system employs ephemeral keys as well. In some embodiments, the notary blockchain engine is configured to post the transaction-completed block on the notary blockchain before consensus for the transaction has been determined, the transaction-completed block including transaction data describing the transaction.

A second aspect is directed to a micro-identification blockchain array system for securely storing data, transactions and/or transaction hashes and personal information of a plurality of users having associated unique identifiers and public and private digital key pairs. The system comprises a micro-identification blockchain array formed by a stack of a plurality of micro-identification blockchains, wherein each one of the micro-identification blockchains is dedicated to a single one of the users such that the one of the micro-identification blockchains stores a native identifier of one of the users, a coded identifier of the one of the users and a set of personal information about the one of the users, a non-transitory computer-readable medium storing a micro-identification blockchain engine configured to receive a transaction request from a user device, the transaction request identifying a pending transaction object between a group of the users, wherein the pending transaction object is digitally signed by the private digital key of each user of the group, generate and post the pending transaction object as a pending transaction block on the micro-identification chain of each user of the group of the users, transmit the pending transaction object to the notary engine and post transaction completed blocks and transaction-failed blocks on the micro-identification blockchains of each of the group of the users upon receipt from a notary blockchain engine.

In some embodiments, the micro-identification engine is configured to generate each of the micro-identification blockchains by generating a first block of the micro-identification blockchain including the native identifier, the encoded identifier and the set of personal information, encrypting the encoded identifier and the set of personal information and generating and appending a second block to the first block, the second block including the encoded identifier and the set of personal information as encrypted. In some embodiments, the micro-identification engine enables the notary engine to access blocks of the micro-identification blockchains including the encoded identifier and the set of personal information as encrypted, but restricts the notary engine from accessing any blocks of the micro-identification chains that include the native identifier. In some embodiments, the micro-identification array is logically organized such that each of the micro-identification chains form a logical row and an initial block of each of the stack of the micro-identification blockchains form a logical first column and each subsequent block of each of the stack of the micro-identification blockchains form logical subsequent columns.

In some embodiments, the system further comprises a database import module stored on the medium and configured to import a database having stacked rows of cells of data by converting each row of the database into a new logical row of the array formed by a new micro-identification blockchain with each cell of the row of the database forming a new block of the new micro-identification blockchain. In some embodiments, the system further comprises a real-time, automated data privacy law and regulatory law compliance engine/module stored on the medium and configured to identify a geographic location of each one of the users when the users registered with the platform and each time the users initiate a transaction on the platform, determine a set of stored geo-location specific data privacy rules that apply to the geographic location and apply the set of data privacy rules to data and/or transaction added to the micro-identification blockchain of the one of the users or to data and/or transactions on the notary chain that are relevant. In some embodiments, in response to the one of the users selecting a right of erasure command, the data privacy compliance engine is configured to delete the micro-identification blockchain of the one of the users.

In some embodiments, in response to the one of the users selecting a right of erasure command, the data privacy compliance engine is configured to store a time that the command was received, determine an applicable set of the set of stored geo-location specific data privacy rules that apply to the one of the users and if the applicable set includes an erasure delay period, delete the micro-identification blockchain of the one of the users if the applicable set does not include the erasure delay period and refrain from deleting the micro-identification blockchain of the one of the users at the time that the command was received for the erasure delay period and deleting the micro-identification blockchain of the one of the users after the erasure delay period has expired if the applicable set includes the erasure delay period. In some embodiments, the system further comprises an anti-poisoning module that determines if the pending transaction object includes illegal or malicious content or content attempting to compromise the cybersecurity of the system and in turn prevents posting of the pending transaction block if the pending transaction object includes illegal or malicious content or content attempting to compromise the cybersecurity of the system content.

A third aspect is directed to a method of recording transactions between a plurality of users having accounts, assigned unique identifiers and assigned public and private digital key pairs on a privacy law compliant blockchain and/or distributed storage and transaction platform. The method comprises generating a micro-identification blockchain array with a micro-identification engine of a blockchain transaction operating system, the array formed by a stack of a plurality of micro-identification blockchains, wherein each one of the micro-identification blockchains is dedicated to a single one of the users such that the one of the micro-identification blockchains stores a native identifier of one of the users, a coded identifier of the one of the users and a set of personal information about the one of the users, operating a notary blockchain that includes a separate single transaction block storing details of each transaction between any two or more of the users by receiving a transaction request from a user device with the micro-identification engine, the transaction request identifying a pending transaction object between a group of the users, wherein the pending transaction object is digitally signed by the private digital key of each user of the group, generating and posting the pending transaction object with the micro-identification engine as a pending transaction block on the micro-identification chain of each user of the group of the users, transmitting the pending transaction object to a notary engine of the operating system with the micro-identification engine, attempting to facilitate execution of terms of a transaction identified by the pending transaction object including a transfer of funds between the group of the users with the notary engine, if the attempt is successful, generating and posting a transaction-completed block on the notary blockchain with the notary engine, the transaction-completed block indicating that the transaction identified by the pending transaction object is completed and transmit copies of the transaction-completed block or hash data representing same to the micro-identification blockchain, if the attempt is unsuccessful, generating a transaction-failed block indicating that the transaction identified by the pending transaction object could not be completed and transmitting copies of the transaction-failed block to the micro-identification engine with the notary engine and posting the transaction completed blocks and the transaction-failed blocks or hash data representing same on the micro-identification blockchains of each of the group of the users with the micro-identification engine upon receipt from the notary blockchain engine.

In some embodiments, generating the micro-identification array comprises generating each of the micro-identification blockchains by generating a first block of the micro-identification blockchain including the native identifier, the encoded identifier and the set of personal information, encrypting the encoded identifier and the set of personal information and generating and appending a second block to the first block, the second block including the encoded identifier and the set of personal information as encrypted. In some embodiments, the notary engine is able to access blocks of the micro-identification blockchains including the encoded identifier and the set of personal information as encrypted, but restricted from accessing any blocks of the micro-identification chains that include the native identifier. In some embodiments, the micro-identification array is logically organized such that each of the micro-identification chains form a logical row and an initial block of each of the stack of the micro-identification blockchains form a logical first column and each subsequent block of each of the stack of the micro-identification blockchains form logical subsequent columns.

In some embodiments, the method further comprises importing a database having stacked rows of cells of data with a database import module by converting each row of the database into a new logical row of the array formed by a new micro-identification blockchain with each cell of the row of the database forming a new block of the new micro-identification blockchain. In some embodiments, the method further comprises with a data privacy compliance engine identifying a geographic location of each one of the users when the users registered with the platform and each time the users initiate a transaction on the platform, determining a set of stored geo-location specific data privacy rules that apply to the geographic location and applying the set of data privacy rules to data added to the micro-identification blockchain of the one of the users. In some embodiments, the method further comprises, in response to the one of the users selecting a right of erasure command, deleting the micro-identification blockchain of the one of the users with the data privacy compliance engine.

In some embodiments, the method further comprises, in response to the one of the users selecting a right of erasure command, with the data privacy compliance engine storing a time that the command was received, determining an applicable set of the set of stored geo-location specific data privacy rules that apply to the one of the users and if the applicable set includes an erasure delay period, deleting the micro-identification blockchain of the one of the users if the applicable set does not include the erasure delay period and refraining from deleting the micro-identification blockchain of the one of the users at the time that the command was received for the erasure delay period and deleting the micro-identification blockchain of the one of the users after the erasure delay period has expired if the applicable set includes the erasure delay period. In some embodiments, the method further comprises determining if the pending transaction object includes illegal, malicious, cybersecurity compromising, hacking, phishing, malware or ransomware, type content and preventing posting of the pending transaction block if the pending transaction object includes the content with an anti-poisoning module. In some embodiments, the private digital keys are not stored on the platform, further comprising dynamically regenerating the private digital keys with a key module upon request by one of the users. In some embodiments, the posting of the transaction-completed block on the notary blockchain is performed before consensus for the transaction has been determined, the transaction-completed block including transaction data describing the transaction.

DETAILED DESCRIPTION OF THE INVENTION

Embodiments are directed to a transaction platform including a notary distributed ledger or blockchain and one or more separate micro-identifier chains (MIDCs) that together enable the secure effectuation and recordation of one or more transactions while maintaining transaction party confidentiality and preventing chain poisoning. The notary distributed ledgers or blockchains are able to be a single transaction blockchain to store, maintain and provide information about the parties related to the transactions which the blockchain is able to utilize in order to securely and quickly validate, execute and record the transactions. The single transaction distributed blockchain is able to be a public or private blockchain (e.g. a distributed blockchain or database across a plurality of computing devices that each store copies of transactions in one or more linked blocks) that maintains a continuously-growing list of data records hardened against tampering and revision. In particular, unlike other blockchains where a single block is used to store thousands of transactions, the single transaction blockchain of this system is able to consist of data structure blocks with each block holding only one individual transaction and/or the results of any blockchain executables. Each block of the blockchain is able to comprise a timestamp and information linking it to a previous block thereby defining the chain and maintaining an order of each of the records/transactions.

The native user data for each user is able to be stored on the micro-identifier chain. A plurality of MIDCs can be combined to form a micro-identifier chain arrays for the transaction platform. In such embodiments, for each user, only a specified single transaction block of their micro-identification chain that stores de-identified user data is able to be accessed by the notary blockchain(s) in order to form on-chain transactions. The data stored on the notary chain(s), and the other single transaction blocks of the micro-identification chain(s) is kept secure from any intruders.

Blockchain Transaction System

Figure 1:
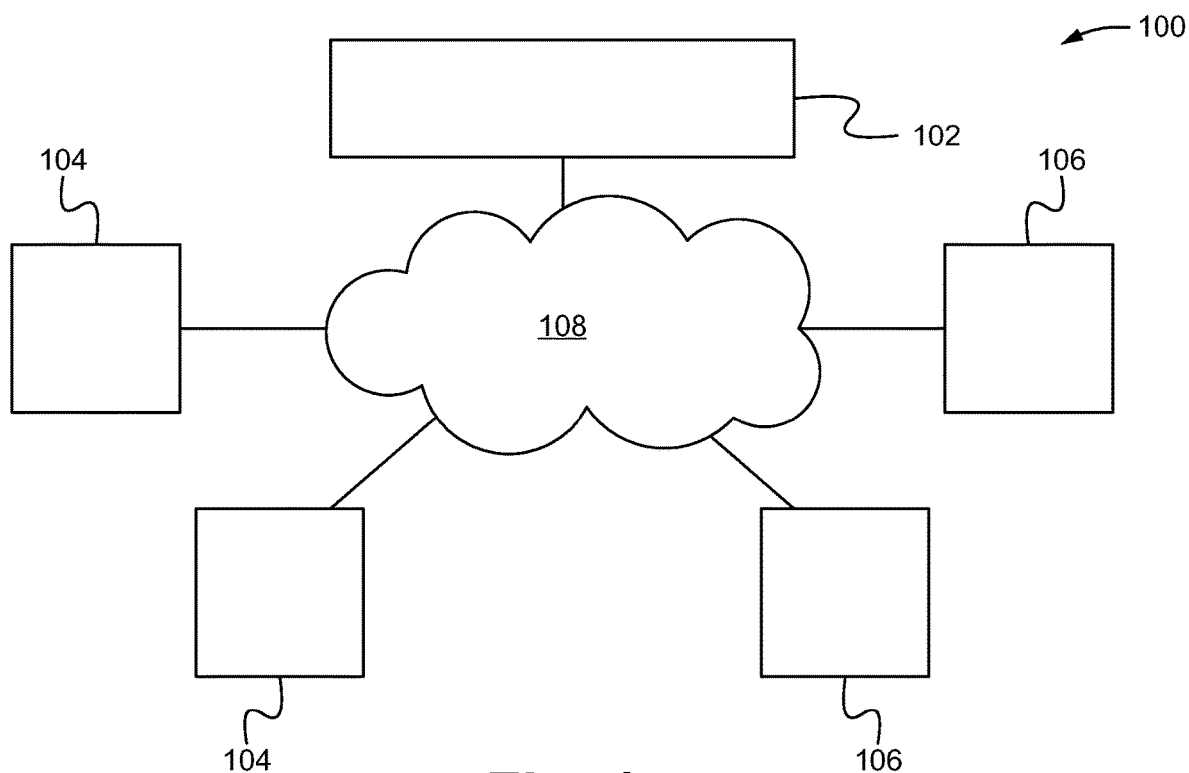
FIG. 1 illustrates a blockchain transaction system according to some embodiments.

FIG. 1 illustrates a blockchain transaction system 100 according to some embodiments. As shown in FIG. 1, the system 100 comprises a transaction platform 102 coupled with one or more buyer devices 104 and one or more seller devices 106 over one or more networks 108. The networks 108 are able to be one or a combination of wired or wireless networks as are well known in the art. Although as shown in FIG. 1 one transaction platform 102 is coupled with two buyer devices 104 and two seller devices 106, it is understood that the system 100 is able to comprise any number of platforms 102, buyers devices 104 and/or seller devices 106 coupled together via the network 108.

Figure 2:
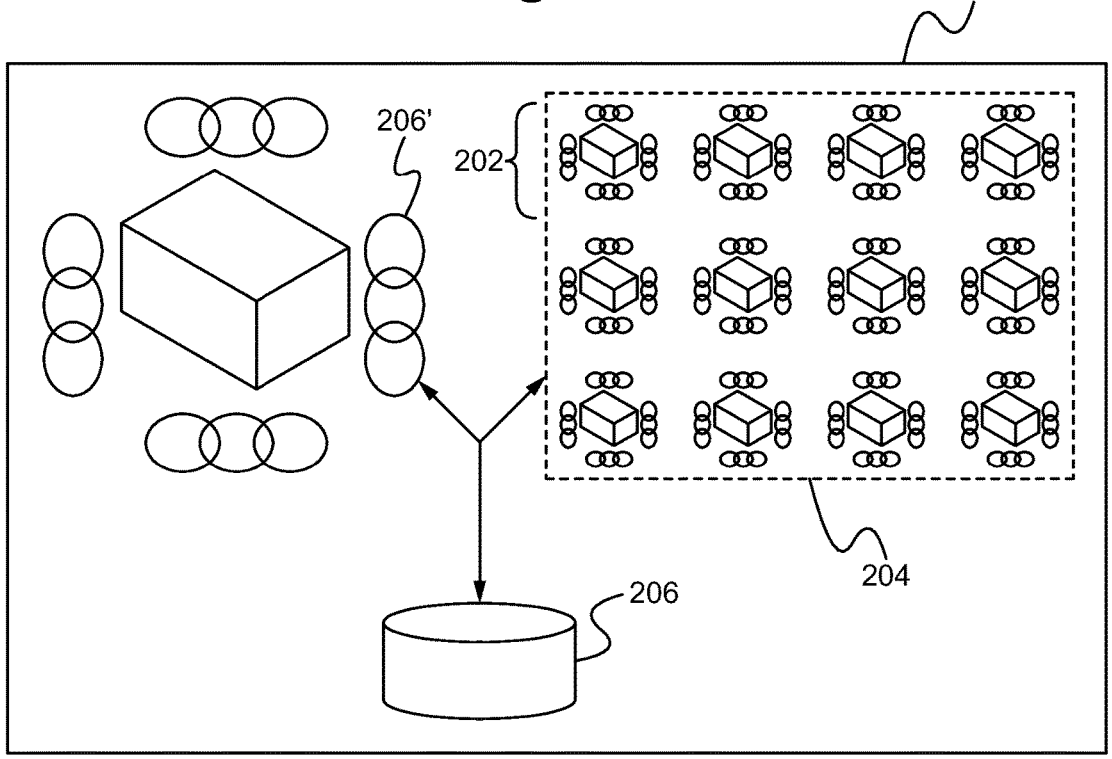
FIG. 2 illustrates a detailed view of the transaction platform according to some embodiments.

FIG. 2 illustrates a detailed view of the transaction platform 102 according to some embodiments. As shown in FIG. 2, the platform comprises a platform operating system (e.g. including a plurality of separate modules and stored on/operated by one or more physical servers or the cloud) 206, one or more micro-identification chain (MIDC) arrays 204 formed by one or more a micro-identification chains 202, and at least one notary blockchain 206' (e.g. notary blockchain cluster(s)) all operably coupled together with the operating system 206 executing the functions described herein with and for arrays 204 and the blockchain 206. In particular, the operating system 206 is able to comprise one or both of programming stored within the arrays 204 and/or blockchain 206 and programming stored outside the arrays 204 and/or blockchain 206 (e.g. within the one or more physical servers or the cloud). Further, in some embodiments the operating system 206 is able to be secure operating systems utilizing encryption in order to protect stored data. In some embodiments, the platform 102 comprises separate MIDC arrays 204 for seller MIDCs and buyer MIDCs. Alternatively, the seller and buyer MIDCs are able to be a part of the same array 204. The operating system 206, arrays 204 and the notary blockchain 206' are able to be coupled together over the network 108 (and/or other networks).

In some embodiments, the platform 102 includes one or more side chains coupled between blockchains of the operating system 206 and/or the MIDC arrays 204. Specifically, the sidechains are able to be mechanisms that allow tokens and other digital assets from one blockchain to be securely used in a separate blockchain and then be moved back to the original blockchain if needed. In other words, the pegged sidechains are a blockchain that is attached to the parent chain (notary blockchain) through the two-way peg mechanism which allows bidirectional transfer of assets between the parent chain and the sidechain at a fixed deterministic exchange rate by using a separate token currency tied to the parent chain. In such embodiments, by using a two-way peg mechanism, the unauthorized creation of tokens and sidechains is precluded. Alternatively, the side chains are able to be omitted and/or application programming interfaces (APIs) may be used by the system to effectuate inter-chain and/or inter-ledger operability.

The notary blockchain 206' is able to be a public/private hybrid blockchain (or a public blockchain or a private permissioned blockchain). For example, the blocks of the blockchain 206' are able to only be viewed by a permissioned user (e.g. having a valid account on the system 100 using the encoder/decoder/view module "Rosetta" described below). In some embodiments, the notary blockchain 206' is plasma network blockchain and smart contract platforms featuring on-chain, off-chain and/or cross-chain atomic swaps, lightning network functionality, two-way pegged sidechains and/or instant payments. In some embodiments, the smart contracts are automated smart contracts each containing a set of rules under which the advertiser, the platform and the user have already agreed that when the rules are met, the agreement is automatically enforced. Specifically, the smart contract code facilitates, verifies and enforces the performance of that agreement and results in a transaction, and smart contract, that is saved to the notary blockchain 206' and/or the MIDCs 202 of the associated buyers/sellers, where proportional pre-determined amounts from the proceeds of the transaction (as specified in the contract) are directed to the user, the platform and/or other entities.

The operating system 206 (and/or the devices 104, 106 if the application is downloadable) include a transaction application that enables the hardware of the operating system 206 (and/or the devices 104, 106) to perform the functions of the system 100 described herein. In some embodiments, the operating system 206 implements the application as a transaction website and/or includes a downloadable transaction application that users are able to visit (e.g. via a web browser) and/or download onto their devices 104, 106 in order to access the features (e.g. modules) of the operating system 206 described below. Specifically, the website and/or downloadable application are able to provide a user interface for receiving and responding to commands/request/input from users and communicating that data to the operating system 206 via the networks 108.

It is understood that although for the sake of brevity the discussion herein describes an exemplary distribution of performance the functions of the system 100 between the operating system 206 and/or the application downloaded onto the devices 104, 106, it is understood that other function distributions between the application and operating system are contemplated including omission of the application such that the operating system performs all functions (e.g. with user interface functions being provided via a website).

The MIDC arrays, also referred to as a Chain Arrayed Data Store, 204 are able to comprise one or more stacked MIDCs 202 such that the blocks of the MIDCs 202 are each a cell of the array with each MIDC 202 being a row of the array and the aligned cells of different rows forming the columns of the array 204. Each MIDC 202 (and thus each row) of the array 204 is dedicated to personal information about a single user/account, wherein any additional information or changes in information being reflected in additional blocks appended to the end of the MIDC 202 for that user/account. Accordingly, each MIDC 202 only ever represents one user and is the blockchain equivalent of all their data on a database. In some embodiments, each MIDC 202 comprises identification data (e.g. name) and personal data (PPI) (e.g. username/password, security questions/answers, age, image, voice, gender, and/or other data associated with the user/account) associated with each other in their native format, a unique identifier assigned to the user/account by the system 100 (e.g. alpha-numeric string), and de-identified data (e.g. an encrypted form of the unique identifier and the PPI).

As described in detail below, when a user registers with the system 100 (e.g. through the API gateway via a website, application, or other front-end user interface), their native identification and PPI and other data such as biometric are captured, a new MIDC is created for this new user/account and a unique identifier is assigned to the user/account. This native identification and PPI data or other user data such a biometrics is then placed in a read-restricted "genesis" block on their MIDC 202. The PPI data and the unique identifier are then able to be encrypted by the system forming "de-identified" PPI. The de-identified PPI is then able to be placed in a new block on the MIDC 202 (appended to the genesis block) that is able to be read by the operating system 206 for use by the notary chain 206. At no point is the notary chain 206 able to access the genesis block including the user PPI in its native form and thus the native form of this data is never posted or otherwise added to any of the transactions recorded on the notary blockchain 206'.

The new MIDC 202 is able to be stacked with any pre-existing MIDCs 202 (of other users/accounts) in order to form the MIDC array 204, which becomes the equivalent of, and is able to fully emulate the functionality of an off-chain server-based database, without their inherent security vulnerabilities. As described above, any new or updates to the PPI of the user/account are added as a new block (that is not readable by the notary chain 206') on the user's MIDC 202 and then this new/updated PPI is encrypted with the unique identifier to create another "de-identified" block that is added to the end of the MIDC 202 of that user/account as a new block reflecting the new data/changes (and being readable by the notary chain 206'). In this manner the notary chain 206' is only ever able to access/read the latest block in a user's MIDC 202 which will only contain de-identified data enabling the GDPR, as well as global data privacy law compliance and security described herein.

The notary blockchain 204 is able to be a node cluster implementing a proof of transaction consensus protocol (as described below) and a partitioned RAFT (P-RAFT) notary and replication protocol. Specifically, each node within the cluster is able to be a P-RAFT leader for a horizontal partition of the blockchain 206' and replicate its log (ledger of transactions) for that partition to a set number of the other nodes. The size and location of the partitions are determined by the operating system autonomously. In some embodiments, the system is pre-sharded in equal sized partitions by default. Alternatively or in addition, the size and location of the partitions are able to be dynamically adjusted and/or manually input by a user. Thus, each node is sent transactions for its given claimed partition, and they are the only P-RAFT leader on that partition. As a result, each of the nodes of the cluster are able to be both P-RAFT leaders of their partition as well as P-RAFT followers for other partitions. In some embodiments, the sequential transactions continue in one partition until such time as that partition is full, and then the next empty partition is filled until complete and so on. In some embodiments, multiple different partitions will be filling simultaneously, and at different rates.

Leaders are changed based on a system algorithm like in RAFT. If a leader goes "offline" a new leader is automatically substituted, as if there was a "normal" leader rotation and like in RAFT the consensus continues. Transactions for that partition are not sent to any other node, and transactions are delivered to the partition leader at least once. From all the nodes, a leader is selected based on a rotating scheme. There can only be one leader for any partitions. In the single fill partition mode, all other nodes are followers to the single leader. In the multi-fill mode, for that particular node all other nodes are followers. A node may simultaneously be a leader for a particular partition and a follower in another partition in multi-fill mode. Leader and follower functions remain intact across single and multi-fill iterations modes. That node will process the transaction and replicate it to a configurable number of peer nodes in the cluster (who are followers for that partition) and then broadcast a confirmation to those follower nodes when they can commit the transactions to the chain for that partition (e.g. when the node has determined that the transactions are valid based on the proof of transaction consensus described herein). Each of the nodes maintain the persistence layer (e.g. direct to attached disk volume) for "their copy" of the partitions they both lead and follow.

In some embodiments, there is dynamic partitioning adjustment where the size and/or quantity of the partitions are adjusted based on the load of each partition (and the associated nodes) to prevent transactional and computational overload. However, because the system can dynamically horizontally scale by adding computing resources, dynamic addition of computing resources is the preferred methodology to adjust for spike in transaction processing needs. As a result, this partitioned P-RAFT notary and replication provided the benefit of distributing the notary and replication workload thereby increasing transaction speed while still providing transaction security.

Operating System

The operating system 206 is able to comprise a registration module, a key module, a notary module, a biometric module, an authentication module ("Rosetta"), a block loader module, a privacy law and regulatory law compliance module, a sales module, a purchase module, an anti-poisoning module, a payment processing module, a ledger module, a security module and a dispute module. Alternatively, more or less modules (and/or micro-services) are able to be used and/or one or more of the modules and/or micro-services (and their associated functions) are able to be combined or divided. Module is interchangeable with "micro-service" herein.

The registration module enables a user (i.e. buyer/seller) to create an account on the transaction system 100 by inputting private personal information (PPI) such username and password information, a native identifier (e.g. name), personal information about the user, contact information (e.g. phone number, email) and/or banking information via a graphical user interface (e.g. of a website and/or transaction application). In some embodiments, the personal information includes biometric data (iris scan, voice recording, fingerprint scan, facial scan, blood type, other biological characteristics or any combination of the foregoing) for implementing biometric verification which in some embodiments this biometric data is also used to enable access to the platform, or for access to transactionality or protected function on the platform. In some embodiments, the personal information is able to be omitted for a user that is a seller. This account information is then associated with a newly generated account and stored on a new MIDC 202 for the user along with a platform-generated unique identifier (as described above) such that the information is able to be used to identify the user when logging onto the platform 102 and other functions of the platform 102. The personal information is able to comprise one or more of the account owner's age, gender, address, income level, religion, political affiliation, race, nationality, interests, height, hair color, eye color, weight, medical conditions, family members, education level, degrees earned, occupation and/or other characteristics of the user. After the account is created, the user is able to access the account and any associated data (e.g. to edit the personal data) by entering the username and biometric data and/or a password in order to identify themselves to the system 100.

Key Management

The key module enables generating and storing of keys and other types of secrets (e.g. unique identifiers) for use with the platform 102. Once a user has entered their PPI and created an account on the platform 102, the key module generates a unique identifier for that user/account (e.g. alpha-numeric identifier) and user/MIDC keys and/or ephemeral keys for that user/account/MIDC that are used to sign transactions, encrypt/view data on the MIDC 202 and sign on to the platform 102. Subsequently, the module encrypts both the unique identifier and the PPI associated with the account and stores it on a block added to the genesis block of the MIDC 202 for that user. As described above, unlike the protected genesis block (including the native PPI and unique identifier) this added block (e.g. the latest block) of the MIDC 202 is able to be accessed by the notary blockchain 206' and/or notary module of the operating system 206 in order to sign/record transactions on the platform 102. In some embodiments, the key module utilizes user passwords (e.g. inputted during registration) with/or without biometric data in order to derive the encryption and signing keys for the user's MIDC 202 and PPI. In some embodiments, the passwords are hashed using the argon2 ID algorithm. For example, in some embodiments the user keys for the MIDCs 202 are deterministically and ephemerally generated by the key module when needed based on both a cryptographically secure hash of the user's password and a secret cryptographic salt. The parameters necessary to derive the MIDC key pair are able to be stored in an MIDC vault that is able to be separate from or a part of the arrays 204. This MIDC key is only used to sign MIDC transactions on behalf of the user and is not compatible with the notary blockchain 206'.

The MIDC keys are able to be used by the buyers/sellers and/or the notary blockchain 206' to log onto the platform 102 as well as to digitally sign transactions/smart contracts in order to effectuate the transactions on the platform 102. In other words, the public key of this pair (the user's "Pubkey") is the user's primary visible identifier within the platform 102, and is also used to encrypt data that only they should be able to read. The private key of the pair is used to sign their MIDC transactions (most user operations) and to sign their JWT to begin authenticated web sessions. Further as described above, in some embodiments the user private keys are not persistently stored by the platform 102. Instead, they are ephemeral and/or regenerated each time they are required using the user's password (and salt and/or other derivation factors). In some embodiments, user keys use Elliptic Curve P256-NIST cryptography.

Like for the user MIDCs 202, the key module is also able to generate notary key pairs for use by the notary blockchain 206 and/or the notary module of the operating system 206 in order to sign transactions and perform other functions. The notary keys are generated and stored in a vault implemented by a MIDC array 204 that the notary chain 206 must query when the keys are needed for signing transactions or other functions. The notary blockchain keys are able to be generated within the vault by the key module and may not be exported. The notary module is the only module within the cluster permitted to execute operations with these keys (e.g. sign, encrypt, decrypt, etc.). As a result, the notary private keys are never known or accessible by the system.

In some embodiments, if the notary module needs to sign transactions that go onto the MIDCs 202 (e.g. records of transactions that have been committed to the notary blockchain 206' and need to also be reflected on the seller/buyer MIDCs 202), the key module is able to issue one-time-use keys for the primary MIDC signature and also require an additional signature with the notary key to ensure the transactions are validated by the notary module itself. In some embodiments, the MIDCs utilize 256-bit EC keys and the notary uses 384-bit keys. Alternatively, other key sizes are able to be used. In some embodiments, the notary keys are intentionally made to be inoperable with the MIDC keys (e.g. using a P384 elliptic curve) thereby providing an added layer of security.

In some embodiments, any time a user wishes to add new PPI, a copy of data needed for account recovery is added to their MIDC 202 using a key deterministically derived from an enrolled recovery method (e.g. a hash of a known private secret combined with an unstored user identifier generated during voice biometric enrollment). When a user wants to recover their account or reset their password, the biometric module (sometimes referred to as the biometric lock), re-identifies the user (e.g. using voice and/or facial identification methods with/or without proof of liveness AI assisted questions that work with the users biometrics) and returns the same identifier used when the user first enrolled. The original key pair is then re-calculated and used to execute an account recover smart contract on the original MIDC 202 of that user, migrating the data from that MIDC 202 to a new MIDC with a genesis block created by the user's new password.

Secure Data Viewing

The authentication module ("Rosetta") enables users to encode/decode and/or read data on the MIDCs 202 in order to access information about their own data, their transactions and/or the other parties to the transactions. Specifically, when it is needed, Rosetta acts as a "decoder" to temporarily allow an appropriate system approved user (subject to certain rules and permissions) to temporarily view that PPI for approved purposes (i.e., accounting, shipping, verification, etc.). The PPI is never moved off the user's MIDC 202. Rosetta allows it to always stay there. No personal data exists anywhere on Rosetta other than the MIDC 202 where it resides. As described herein, the notary blockchain 206' uses an encrypted, substituted and anonymized/pseudo anonymized identification data and unique identifiers for buyers and sellers. These identifiers on the notary blockchain 206' act as pointers for Rosetta to locate the relevant "Buyer" and/or "Seller" identifiers for a transaction, so Rosetta can allow an authorized user to see that PPI, after Rosetta locates and decodes it from the MIDC 202 of those identified/pointed to buyers/sellers. Additionally, Rosetta is able to authenticate and authorize user sessions for the platform 102, sign user transactions, tokenize data for PPI searches, create permissioned copies of PPI for parties authorized to access it by users during the course of transaction execution, re-encrypted with the receiving party's key, set up and manage stenographic pipelines for important flows like registration and login and/or other authentication functions.

Additionally, if a user wishes to view data stored on another user's MIDC 202 (e.g. from a previous transaction between the users), Rosetta is able to securely provide access to view that data (assuming the user has authority to view that data). For example, if a first user (that has been authenticated) issues a request to Rosetta to view data (e.g. a specified transaction) of a second user, Rosetta parses the request for the first user password and the target MIDC/user identified in the request. Rosetta is then able to generate a certificate (e.g. public key infrastructure key) using the user password and/or other data (e.g. user password, salt, other parameters and/or hashes thereof) and send the certificate to the key module in a request for the key derivation parameters for the second user stored on the platform 102 (e.g. on the MIDC vault controlled by the key module or elsewhere on the platform 102). If the certificate is authentic (e.g. the password and other parameters used to generate the certificate were correct), the key module retrieves and transmits the second user's key derivation parameters to Rosetta which is able to use the received key derivation parameters (e.g. along with the user password and salt) with a key derivation function (e.g. Argon2) to derive a key seed. Rosetta is then able to use the key seed to dynamically generate the second user's key pair using the same key generation function that was used by the key module to originally generate the second user's key pair (e.g. EC256).

Further, Rosetta is able to retrieve the MIDC block of the first user's MIDC 202 including the data that the second user is permitted to view (e.g. the transaction including user and/or identified within the initial request). In particular, the target block of the first user's MIDC is able to be encrypted using the public key of the second user and then decrypted by Rosetta using the second user's dynamically regenerated private key. Accordingly, Rosetta is then able to present the data to the second user (e.g. in memory only through secure data channel) for view via the graphical user interface of the platform 102 (e.g. application, browser/website, and/or other graphical user interfaces). In some embodiments, even after decryption the data is scrambled such that Rosetta further needs to descramble the text using a descrambling algorithm before it is presented to the second user. Therefore, Rosetta provides the advantage of enabling authenticated users to view data on other user's MIDCs 202 while still maintaining data security.

Database Importing

The block loader module enables a user to load an existing database into the MIDC array 204 to simplify, and automate, user migration from a DBMS to the transaction platform 102. Since the MIDCs 202 of the platform 102 use single transaction blocks for each transaction and/or dataset, each block of an MIDC 202 is the functional equivalent to a "cell" in a database such that the entire chain of the MIDC 202 is the functional equivalent to a separate row in the database and the blocks that align between the MIDCs 202 when they are stacked on top of each other (in the array 204) are the functional equivalent to a separate column in the database. Thus, the stack of MIDCs 202 of separate users forming the MIDC array 204 of the platform 102 is able to form a functional equivalent of a database with columns and rows.

Because of this MIDC array 204 structure (e.g. stacked MIDCs each dedicated to a separate user), the MIDC array 204 is searchable and has create, read, update and delete functionality like a database. The delete functionality is achieved by deleting the entire MIDC 202 like deleting an entire row of a database (and replacing it with a new MIDC 202 if desired such as for user password/account reset). Append is able to be achieved by creating additional single transaction blocks for the associated chain 202 with additional data reflecting the new/updated data (wherein the authentication module Rosetta is structured to look for the block in an MIDC with the "latest" data whether it is a block containing a revised address or other PPI for a user, or a block in a series of blocks for a particular transaction that might show a shipping change or dispute resolution for example).

As a result of the MIDC array 204 structure, the block loader module is able to migrate the cells, rows and columns of databases to the functional equivalent blocks, chains and aligned blocks in stacks of chains of the MIDC array 204. Thus, the block loader module is able to effectuate a migration of an existing database to the platform 102 while preserving the structure and data of the original database it was on. In some embodiments, the block loader is able to automate this migration and utilize a cloud-based structure to achieve this migration.

Privacy Law and Regulatory Law Compliance

The privacy compliance module automates and maintains data privacy law and regulatory law compliance functions, so that data on the system—from original collection, through storage, curation, retention and deletion—is done in such a way that the data is always in compliance with all global data privacy laws and regulatory laws (e.g. health insurance portability and accountability act (HIPAA), financial industry regulatory authority (FINRA), securities and exchange commission (SEC), know your customer (KYC), anti-money laundering (AML), etc.). First, all global data privacy laws and regulatory laws, be they county, state/provincial or category specific (e.g. general data protection regulation (GDPR), California consumer privacy act (CCPA), federal information security modernization act (FISMA), health insurance portability and accountability act (HIPAA), payment card industry (PCI)) are broken down and loaded as rules into the privacy compliance module engine. Second, each time user data (e.g. PPI) is added to the platform 102, the module uses geolocation functions (e.g. upon user registration and/or log on to the system) to determine their location and access the associated stored privacy rules based on the determined location. Third, the module applies the identified rules to the data. In some embodiments, the rules are automatically periodically updated and adjusted to changes in the law such that they always apply the most up to date rules to each set of data on the platform 102. In some embodiments, the privacy compliance module uses AI/Machine Learning to assist in the application of the aforementioned rules, along with geo-locating all users, at all times to automate data privacy law compliance.

For example, if the platform 102 is deployed by a medical office in Los Angeles, Calif. and after January of 2020 the compliance module sees a user on-board to the platform 102, the privacy compliance module applies the appropriate data privacy law rules to that user's data (e.g. PPI) including; but not limited to: CCPA+HIPAA+PCI which are all applicable for that location. As another example, if the platform 102 is deployed for a hotel chain and the user originally on-boarded in London where the privacy law and regulatory law compliance module/engine applied GDPR+PCI and any other relevant and appropriate data privacy laws to the user's data for that location. That user then travels to Beijing and checks into a hotel chain's property there. Because the privacy law and regulatory law compliance module geo-locates the user for each and every transaction that they make on the platform 102, it will automatically determine the new location and additionally apply Chinese data protection and regulatory law and any other Chinese law governing the transfer of data to jurisdictions outside the territorial boundaries of China. As a result, the privacy law and regulatory law compliance module/engine provides the benefit of automating compliance with data privacy law and regulatory laws even when involving multiple jurisdictions and types of laws.

This functionality applies to users electing to enforce their Right of Erasure as well. While users have the unfettered right to erase their data, most times that erasure is not immediate. Global data privacy laws have exceptionalities of holdbacks that allow companies to not immediately erase a user's data even after they have enacted their Right to Erasure. A sample of reasons for such delaying of erasure include provision in global data laws for: credit care chargeback periods, to comply with tax laws, or for contract reasons, public interest, research, etc. all with different allowable tolling periods.

As a result, the privacy compliance module also enables a user/entity operating the platform 102 to select any of the erasure delaying provisions that apply to them and the module will then automatically implement those delays (e.g. start a timer or otherwise monitor when in the future the data should be erased and then effectuating the erasure at that time after the appropriate delay period has elapsed). In particular, when a user elects to exercise their right of erasure of their stored PPI, the privacy compliance module automatically:

1. Transmits a message to the user indicating that they system has time-stamped their erasure request.
2. Transmits a message to the user indicating any legal tolling/delays that apply to their requested right of erasure.
3. Sets a clock or other timing function, based on the user time-stamped deletion request, as to when deletion is to be made upon the expiration of said tolling period.
4. When that tolling period expires, effectuates the user's Right to Erasure request by deleting that users MIDC 202 and notifies the user that their data has been removed from the system.

Finally, in the unlikely event of a breach of the system (or any event resulting in disclosure of some or all of one or more user's PPI) the privacy compliance module will, taking into account the applicable data privacy law (based on the user(s) and their location), automate and effectuate the reporting of said breach to both users and the appropriate regulatory agency(s). Thus, the platform 102 provides the benefit of being autonomously, and in real-time, with zero-trust, being compliant with GDPR, CCPA and other all data privacy laws while maintaining the benefits of the blockchains immutability.

Transactions

The sales and transaction module/engine enables a user/seller to input product and/or service information (e.g. description, price, delivery options and other product/service details) that the seller wishes to provide for sale on the platform 102. In some embodiments, the sales module provides a unique identifier for each of the products/services. Upon submission of the product/service information, the sales module generates a smart contract that reflects the indicated parameters of the sale of the product/service along with the encrypted seller unique identifier and/or the product/service identifier. The sales module then adds this smart contract and the identifier(s) as a single transaction block for each product/service on the seller MIDC 202. Alternatively, the product/service transaction blocks are able to be stored in a different location such as a different MIDC array 204 and/or other type of memory. Again, because the native user identifiers are not used, the information stored on these product/service blocks of the seller/buyer MIDCs 202 is fully de-identified (fully encrypted, pseudo anonymized and anonymized) such that it is not connectable to any natural user identification information.

The purchase module enables a user to view and purchase one or more of a list of products and/or services that have been provided for purchase by the sellers via a smart contract on a block on the seller's MIDC 202 on the platform 102. Specifically, the products and/or services presented are able to reflect the terms of the open smart contracts for the products and/or services created by the sellers and stored on the seller MIDC 202 such that the buyers are able to choose whether they agree to those terms and to complete the smart contract.

Once a buyer selects one or more products of a seller and submits a purchase command to the purchase module (e.g. via a buyer device 104), the purchase module checks the buyer and seller credentials by accessing the buyer's MIDC 202 and the seller's MIDC 202 to determine if they are in good standing, meaning they have been determined to not be a user that has engaged in fraudulent transactions or one that has been flagged and or removed from the system for malevolent behavior such as trying to either chain-poison the system or compromise the cybersecurity of the system. If the credentials for both the buyer and the seller are able to be verified/authenticated, the purchase module generates a pending transaction object for the buyer and the seller. If the verification/authentication fails, the transaction is terminated. The pending transaction object is able to comprise information about the transaction including, but not limited to, one or more of: the terms of the contract for the product (as input to the platform by the seller as described above), the buyer unique identifier, the seller unique identifier, the product(s) identifier(s), the date/time, a transaction hash, a generated transaction identifier, product(s) information and/or other data about the transaction. The purchase module is able to determine the appropriate product contract information/terms using the product identifier included in the purchase request as an pointer to the product information and contract terms on the MIDC 202 where it was uploaded by the seller (as described above).

For each generated pending transaction object, the anti-poisoning module inputs the transaction and determines if it includes any illegal, malicious, cybersecurity compromising, ransomware, malware, phishing or pornographic content etc., (e.g. using image and text analysis engines and/or comparing the data of the transaction object to a set of known illegal images, malware, ransomware, phishing and/or other data). If illegal content is found, the module is able to terminate the transaction object and/or remove the illegal content from the object or rejects the transaction in its entirely and removes the content and pending block by deleting it from the system. It is able to in some embodiments delete the user and their MIDC from the system altogether. If the anti-poisoning module approves the pending transaction objects of the buyer and the seller, the purchase module posts the pending transactions objects to the buyer and seller MIDCs 202, respectively, signs the pending transaction object with both the buyer and seller private keys, and transmits the signed pending transaction object to the notary module/notary chain 206'. In some embodiments, the signing comprising sending confirmation requests to the seller/buyer devices 104, 106, wherein the confirmation requests comprise a challenge message that needs to be digitally signed by the buyer and seller devices 104, 106 using their respective buyer/seller encrypted keys (e.g. as dynamically generated by the key module upon request). These digital signatures are able to later be validated by notary module (e.g. using the associated paired keys known by the key module) as a part of determining if there is consensus for the transaction as described below. The notary module receives these signed pending transaction objects and puts them in a queue for posting and sends them to the payment processing module for payment processing.

After the notary module receives the signed pending transaction objects, the payment processing module processes the payment indicated in the smart contract(s). For example, for an external gateway payment, once the notary module broadcasts a pending transaction object (that has been signed/confirmation by seller and buyer), the payment processing module processes the associated payment against the proper payment gateway. If instead payment is to be via a platform currency, the payment processing module requests/receives from the buyer MIDC 202 digital tokens from the account associated with the buyer identifier equal to the price indicated in the smart contract, and transfers the money/tokens to the owed parties (e.g. the account of the seller identifier and/or the system fee account). In some embodiments, the payment processing module ensures that all tokens/monies remain within the control of the operating system 206 and/or a central authority until a physical withdrawal is effectuated by a user. If one or more tokens, or fiat currencies, are stolen from a buyer and/or seller account, because all users are known because they must have been previously on-boarded and registered on a permissioned chain, the platform 102 is able to trace the tokens and record on the notary blockchain 206' that the tokens are no longer valid as well as replacing the stolen tokens in the account with newly minted tokens. In either case, if the payment is successful, the notary module then signs the pending transaction object thereby forming a completed transaction object using the notary keys, and posts the completed transaction object as a single transaction block on the notary blockchain 206'.

The notary module then creates completed transaction confirmation blocks and posts them as a single transaction block on each of the buyer and seller MIDCs 202 (appended to the blocks including the pending transaction objects). Thus, for each completed transaction, there will be two blocks posted to each of the buyer and seller MIDCs 202 (pending/initiated and completed transaction blocks) and one block posted on the notary blockchain 206' (completed transaction block). If the payment processing fails or the transaction is otherwise terminated after posting of the pending transaction object blocks, then no transaction block is added to the notary blockchain 206', and instead of the completed transaction, the notary module posts a failed transaction block (indicating what caused the transaction to fail) on the buyer and seller MIDCs 202.

The completed transaction blocks (posted to the notary blockchain 206' and/or buyer and seller MIDCs 202) are able to be time-stamped, posted ordered and validated in real-time. In particular, unlike other blockchain systems, the notary module posts the block without first waiting for a full node consensus that the transaction is valid (e.g. not fraudulent). This enables the platform 206 to post transactions faster than any existing blockchain system resulting in greater throughput and efficiency of the platform 206. The posted block is able to indicate the terms of the transaction (e.g. price, date, payment, and other transaction data) or a reference to a smart contract for that transaction, as well as the seller and buyer encrypted unique identifiers (and/or the product identifier). Additionally, the transaction is posted as a single transaction block on the notary blockchain 206', the transaction is able to be later corrected by adding a new single transaction block to the blockchain 206' that indicates any necessary modifications to the original block. In some embodiments, the platform also effectuates the delivery of the product by digitally delivering the product to the buyer (e.g. buyer device 104) if a digital product or sends a message to the seller to deliver the digital or non-digital product to the buyer (e.g. buyer device 104 or buyer shipping address).

In some embodiments, the ledger module is used to maintain an account balance of one or more currency values on one or more of the user accounts. In such embodiments, upon completion of a transaction, the ledger module posts a new single transaction block on the buyer and seller MIDCs 202 indicating the adjustment to the existing account balance to the seller/buyer accounts on the seller and buyer MIDCs 202, respectively. Again, each of these transactions is added to their MIDCs 202 as a single transaction block (rather than multiple transactions in a single block) such that if there is a dispute or error, the single transaction block having the error is able to be corrected by a new updated single transaction block added to the MIDCs 202. For example, a fraudulent charge indicated in a first single transaction block on the MIDC 202 of the buyer is able to be corrected by a subsequent updated single transaction block crediting the charged amount back to the account (thereby correcting the indicated account total). This would not be possible if a single block was used for multiple transactions because the fraudulent transaction could not be corrected without also affecting all the other non-fraudulent transactions contained within that block. Alternatively, in the case where buyer/seller accounting is provided external to the platform 102, the ledger module and/or the MIDC 202 account balance blocks are able to be omitted.

At the same time as the pending transaction object signing, payment processed and/or posting of the completed transaction blocks (e.g. before, simultaneously or concurrently), the security module is able to perform a proof of transaction consensus process on the transaction in order to validate the transaction is not fraudulent or otherwise invalid. In some embodiments, the security module performs the proof of transaction consensus process by verifying that the buyer encryption keys used to sign the transaction are valid keys (e.g. that are associated with the encrypted buyer identifier using a hash verification of the keys). In some embodiments, the security module/engine includes artificial intelligence in order to aid in the speedy determination of consensus of each of the transactions. If the proof of transaction fails, the security module/engine notifies the notary module and the ledger module (if it is being implemented) so the notary module is able to post a new single transaction block correcting (e.g. nullifying) the transaction on the notary blockchain 206' and the ledger module is able to similarly post new single transaction blocks correcting the account balances of the seller and buyer on the seller/buyer MIDCs 202.

The dispute module receives transaction disputes from buyer and/or seller devices 104, 106 and resolves the disputes even after the single transaction block of the transaction has been posted to the notary blockchain 206' without compromising immutability of the blockchain 206'. Specifically, the dispute module operates as the central authority by determining if the smart contract conditions were met (e.g.

payment made, product delivered) and adjudicates disputes and determine resolution adjustments (if necessary) to the disputed transaction. Upon determination of the resolution of the dispute, if necessary, the notary module posts a new single transaction block to each of the notary blockchain 206' tied to the previously posted block (and any "family") for the transaction reflecting the dispute results and thereby correcting any previously posted block reflecting the disputed transaction.

As a result, related transactions (original blocks and subsequent corrections) are able to be readily grouped by and easily viewed on the chains 202, 206' as a "family" of blocks all related to the same transaction and or specific user, buyer or seller. Thus, the dispute module provides the benefit of being able to effectuate reconciliation of a dispute within the platform 102 without compromising the immutability of the blockchain 206'. Thus, the platform 102 provides the benefit of being able to run transaction processing, validation and posting of ordered single transaction blocks in real-time (e.g. posting before consensus is complete) as well as providing dispute resolution in order to correct errors and/or fraudulent charges. In some embodiments, the dispute module includes a loss mitigation function/engine (e.g. powered by artificial intelligence and/or machine learning) that monitors transactions submitted to the notary blockchain operating system 206 and identifies and stops suspicious transactions from being completed (e.g. from being recorded on the blockchains at all).

Operating Method

Figure 3:
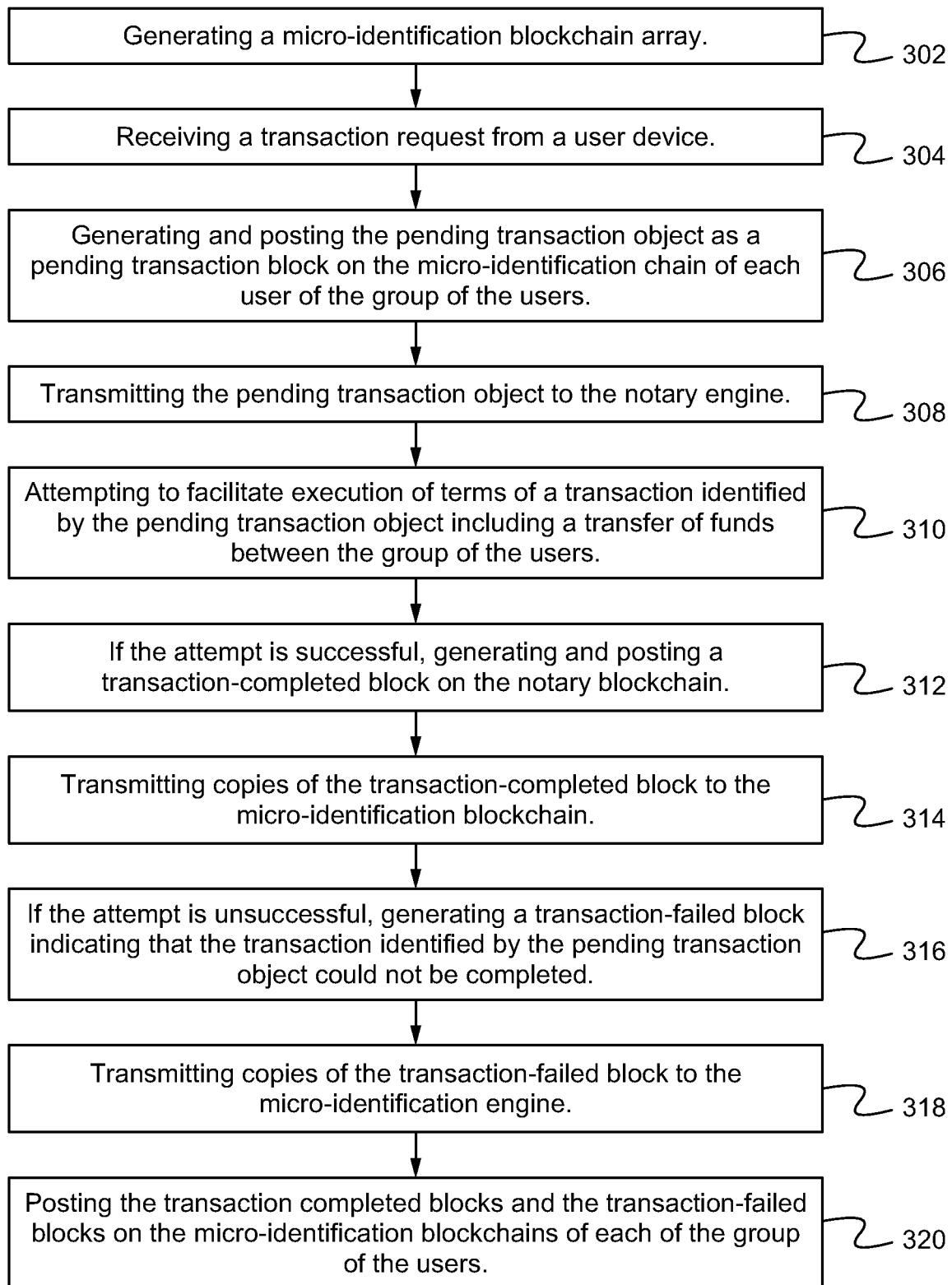
FIG. 3 illustrates a method of implementing a blockchain transaction platform according to some embodiments.

FIG. 3 illustrates a method of implementing a blockchain transaction platform 102 according to some embodiments. As shown in FIG. 3, a micro-identification engine of the blockchain transaction operating system generates a micro-identification blockchain array 204 at the step 302. In some embodiments, the array 204 formed by a stack of a plurality of micro-identification blockchains 202, wherein each one of the micro-identification blockchains 202 is dedicated to a single one of the users such that the one of the micro-identification blockchains 202 stores a native identifier of one of the users, a coded identifier of the one of the users and a set of personal information about the one of the users. The micro-identification engine receives a transaction request from a user device 104, 106 at the step 304. In some embodiments, the transaction request identifies a pending transaction object between a group of the users, wherein the pending transaction object is digitally signed by the private digital key of each user of the group. The micro-identification engine generates and posts the pending transaction object as a pending transaction block on the micro-identification chain 202 of each user of the group of the users at the step 306. The micro-identification engine transmits the pending transaction object to a notary engine of the operating system 206 at the step 308.

The notary engine attempts to facilitate execution of terms of a transaction identified by the pending transaction object including a transfer of funds between the group of the users at the step 310. If the attempt is successful, the notary engine generates and posts a transaction-completed block on the notary blockchain 206' at the step 312. The transaction-completed block indicates that the transaction identified by the pending transaction object is completed. The notary engine transmits copies of the transaction-completed block to the micro-identification blockchain 202 at the step 314. If the attempt is unsuccessful, the notary engine generates a transaction-failed block indicating that the transaction identified by the pending transaction object could not be completed at the step 316. The notary engine transmits copies of the transaction-failed block to the micro-identification engine at the step 318. The micro-identification engine posts the transaction completed blocks and the transaction-failed blocks on the micro-identification blockchains 202 of each of the group of the users upon receipt from the notary blockchain engine at the step 320.

In some embodiments, generating the micro-identification array 204 comprises generating each of the micro-identification blockchains 202 by generating a first block of the micro-identification blockchain 202 including the native identifier, the encoded identifier and the set of personal information; encrypting the encoded identifier and the set of personal information; and generating and appending a second block to the first block, the second block including the encoded identifier and the set of personal information as encrypted. In some embodiments, the notary engine is able to access blocks of the micro-identification blockchains 202 including the encoded identifier and the set of personal information as encrypted, but restricted from accessing any blocks of the micro-identification chains 202 that include the native identifier. In some embodiments, the micro-identification array 204 is logically organized such that each of the micro-identification chains 202 form a logical row and an initial block of each of the stack of the micro-identification blockchains 202 form a logical first column and each subsequent block of each of the stack of the micro-identification blockchains 202 form logical subsequent columns.

In some embodiments, the method further comprises importing a database having stacked rows of cells of data with a block loader module by converting each row of the database into a new logical row of the array 204 formed by a new micro-identification blockchain 202 with each cell of the row of the database forming a new block of the new micro-identification blockchain 202. In some embodiments, the method further comprises, with the compliance module, identifying a geographic location of each one of the users when the users registered with the platform 102 and each time the users initiate a transaction on the platform 102; determining a set of stored data privacy rules that apply to the geographic location; and applying the set of data privacy rules to data added to the micro-identification blockchain 202 of the one of the users. In some embodiments, the method further comprises, in response to the one of the users selecting a right of erasure command, deleting the micro-identification blockchain 202 of the one of the users with the compliance module.

In some embodiments, the method further comprises, in response to the one of the users selecting a right of erasure command, storing a time that the command was received; determining an applicable set of the set of stored data privacy rules that apply to the one of the users and if the applicable set includes an erasure delay period; deleting the micro-identification blockchain 202 of the one of the users if the applicable set does not include the erasure delay period; and refraining from deleting the micro-identification blockchain 202 of the one of the users at the time that the command was received for the erasure delay period and deleting the micro-identification blockchain 202 of the one of the users after the erasure delay period has expired if the applicable set includes the erasure delay period. In some embodiments, the method further comprises determining if the pending transaction object includes illegal, malicious, cybersecurity compromising, hacking, phishing, malware or ransomware, type content and preventing posting of the pending transaction block if the pending transaction object includes illegal, malicious, cybersecurity compromising, hacking, phishing, malware or ransomware, type content with the anti-poisoning module. In some embodiments, the private digital keys are not stored on the platform 102 and the method further comprises dynamically regenerating the private digital keys with the key module upon request by one of the users. In some embodiments, the posting of the transaction-completed block on the notary blockchain 206' is performed before consensus for the transaction has been determined, the transaction-completed block including transaction data describing the transaction.

As a result, the method provides the advantage of providing MIDCs for storing user personal data and/or transactions thereby ensuring their safety over data stored on traditional databases while still enabling data privacy law and regulatory law compliance. Further the method provides the benefit of enabling transactions to be quickly posted before full node consensus has been determined while also being correctable due to each block only storing a single transaction such that errors are able to be corrected to subsequent single transaction correction blocks. This in contrast to other blockchain systems where full node consensus is required before blocks are able to be posted and thousands of transactions are stored on a transaction blocks containing multiple transactions such that to change an error on a block with a new single transaction block would require costly disruption of all of the other transactions that do not include an error on that block—which would also compromise the immutability of those existing chains due to their existing architectures. Further, the method provides the advantage of retaining the benefits of the immutability of the blockchains while still being automatically GDPR, CCPA and other data privacy law compliance and able to fully de-identify any user data/and or user stored private personal information at the request of the user without compromising the immutability of the systems on-chain blocks and blockchains. Moreover, the method provides the advantage of preventing block poisoning by implementing block screening before any block is posted on the notary chain 206' or MIDCs 202. Finally, the method provides the advantage of dynamically generating keys such that they cannot be phished from users or stolen from inside the platform 102.

Exemplary Device

Figure 4:
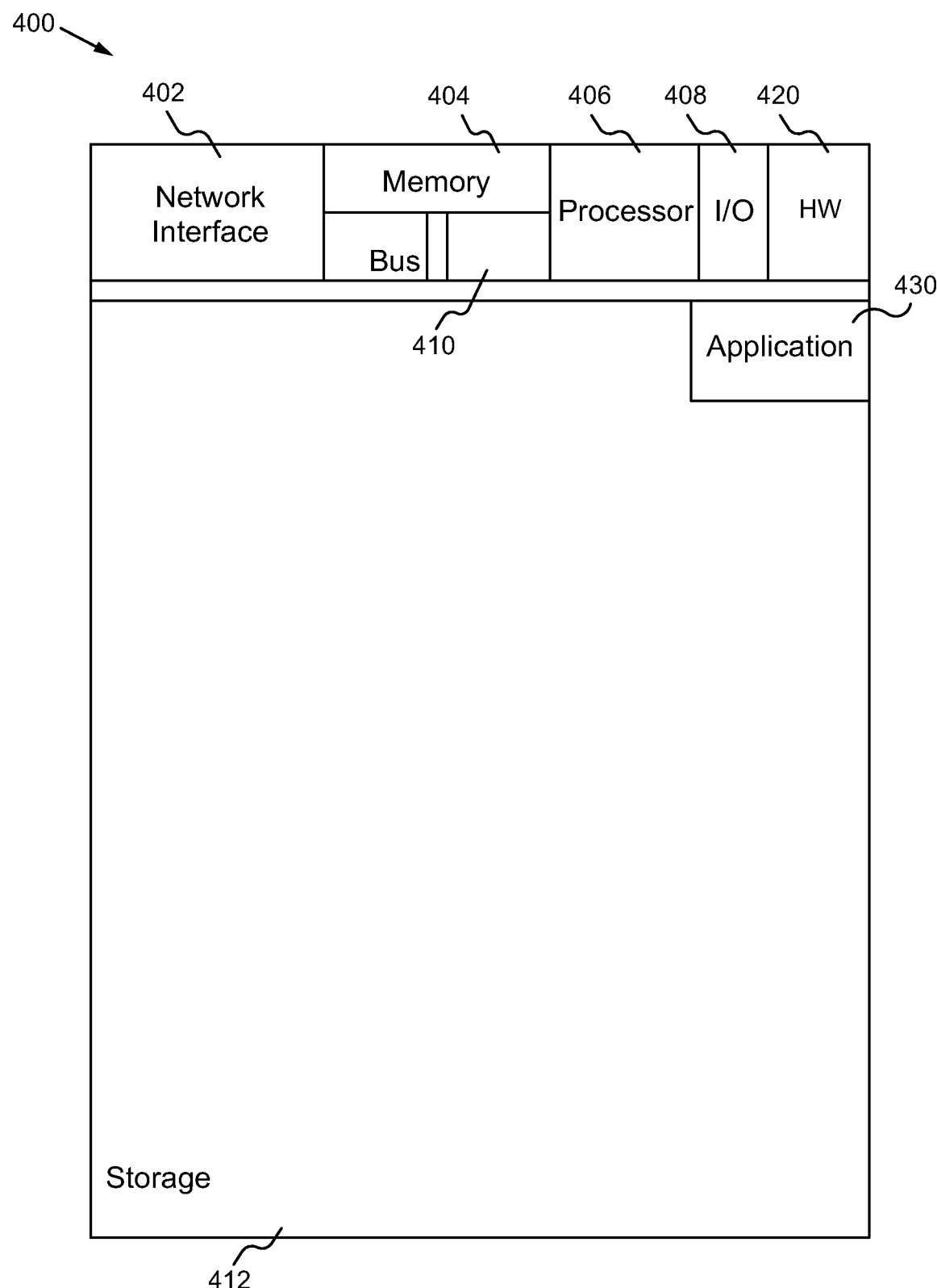
FIG. 4 illustrates a block diagram of an exemplary computing device according to some embodiments.

FIG. 4 illustrates a block diagram of an exemplary computing device 400 according to some embodiments. The computing device 400 is able to be one or more of the operating system 206, devices 104, 106 and/or the blockchain 206'. In general, a hardware structure suitable for implementing the computing device 400 includes a network interface 402, a memory 404, a processor 406, I/O device(s) 408, a bus 410 and a storage device 412. Alternatively, one or more of the illustrated components are able to be removed or substituted for other components well known in the art. The choice of processor is not critical as long as a suitable processor with sufficient speed is chosen. The memory 404 is able to be any conventional computer memory known in the art. The storage device 412 is able to include a hard drive, RAM, SRAM, CDROM, CDRW, DVD, DVDRW, flash memory card or any other storage device. The computing device 400 is able to include one or more network interfaces 402. An example of a network interface includes a network card connected to an Ethernet or other type of LAN. The I/O device(s) 408 are able to include one or more of the following: keyboard, mouse, monitor, display, printer, modem, touchscreen, button interface and other devices. The operating system and/or module(s) 430 used to operate the platform are likely to be stored in the storage device 412 and processed as applications are typically processed. More or less components shown in FIG. 4 are able to be included in the computing device 400. In some embodiments, hardware 420 is included. Although the computing device 400 in FIG. 4 includes software 430 and hardware 420, the features of the system 100 are able to be implemented on the computing device 400 in hardware, firmware, software or any combination thereof. Examples of suitable computing devices include a personal computer, a laptop computer, a computer workstation, a server, a datacenter, a mainframe computer, a handheld computer, a personal digital assistant, a cellular/mobile telephone, a smart appliance, a gaming console, a digital camera, a digital camcorder, a camera phone, an iPod™, a video player, a DVD writer/player, a Blu-ray™ writer/player, a television, a home entertainment system or any other suitable computing device. Further, it is understood that the system 100 and/or platform 102 is able to be deployed in single server or cluster of servers modes as well as on premises, data center, dedicated data center or via cloud computing environments and/or combinations thereof.

Use Cases

In some embodiments, the transactions are able to be initiated as a part of an International Token Exchange (ITX) module/engine. In particular, the ITX module is able to be an SEC and FINRA compliant module/engine (e.g. implemented using a downloadable or non-downloadable application, website, or combination thereof) to allow for the automated blockchain based trading and instant settlement of tokenized securities of any kind using the platform 102. As a result, the ITX module provides the benefit of being the only platform 102 capable of recording such transactions, along with buyer and seller PPI via the automated engine/platform that does so in a fully data privacy and regulatory law complaint manner.

In some embodiments, the platform 102 comprises an electronic learning data privacy law and regulatory law compliance module/engine that enables educational tools to seamlessly comply with data privacy and regulatory laws. Specifically, the compliance engine/module is able to function as middleware between schools and eLearning providers as an automated, real-time data privacy law and regulatory laws compliance engine. First, it insures that the data and private personal information of the school's student population is always on-boarded, collected, curated, stored and deleted (when required) in compliance with all global, federal and state data privacy and regulatory law in an autonomous, 24/7, zero-trust manner. Second, it ensures that all student data is stored on its impenetrable and fully cyber-secured platform. As a result, that student data cannot be hacked, ransomed or phished.

In some embodiments, the platform 102 comprises a human resource engine/module that uniquely enables a company's human resource division to interact with its employees, on a private, secure, data privacy and regulatory law compliant level, to ascertain if their employees have had, and passed, a test (e.g. Covid-19 antibody test) in order to allow them to safely return to the workplace. In particular, the human resource engine/module enables a company to upload its employee database to an iteration of the platform 102 (e.g. its own private iteration). Then through a browser portal and/or application of the platform/human resource engine, the company is able to select to issue a company-wide message (e.g. email, text, other electronic message or a combination thereof), specific department messages or just an individual message apprising the recipient(s) that the company is now using the human resource engine to ensure a safe workplace (e.g. regarding covid-19).

The message will then direct the recipient(s) to download the human resource engine app which dynamically determines and provides locations and/or directions to locations where acceptable antibody testing is being done. Further, the engine issues each employee a unique QR code (or other unique identifier) which in turn allows the testing lab to securely upload that person's covid-19 antibody test data (and/or other test data) to the human resource engine/module to be stored on the platform 102 (e.g. on an MIDC for that employee) preserving the authenticity of the results.

During the initial on-boarding process for an individual employee, the human resource engine/module captures all appropriate privacy and regulatory permissions (e.g. HIPAA) to allow the results of the test (e.g. covid-19 antibody lab test) to be legally shared with the employer from either the individual, or from the lab. In particular, the platform allows such sharing to be zero-trust, fully automated and regulatory law compliant. The on-boarding process for each individual by the engine/module is also able to capture permissioned biometrics from that individual such that the engine/module provides the benefit of dynamically updating biometric lock specific to each user. This also allows the platform 102 to uniquely ensure that the only party that ultimately controls an employee's Private Personal Information is that employee/individual.

In some embodiments, the human resource engine/module provides a graphical user interface (e.g. via a mobile application and/or website) that allows a person to display or export their testing status at will, and in real time. It also is able to allow human resources at a company to see their employees' real-time test results (e.g. covid-19 antibody status), again in a user permissioned and privacy law compliant manner, from a desktop browser accessing the platform 102. In some embodiments, a user that currently has a medical status (e.g. covid-19 positive), or has not gotten tested yet (e.g. anti-body tested), would have their status visibly demonstrated (e.g. by an unmistakable RED background displayed behind their picture on the graphical user interface of the application and/or website. Further, a user that has had a test, but where the lab results are still pending is able to have a different indicator (e.g. a YELLOW background displayed behind their picture), and a user that has not only had an antibody test, but who has passed that covid-19 antibody test would have another different indicator (e.g. a GREEN background displayed behind their picture). Alternatively, other indicators are able to be used. Further, although antibody tests and/or covid-19 tests are described herein as examples, other tests and/or medical conditions are able to be used.

Advantages

The system 100 described herein have numerous advantages. In particular, the system 100 provides the advantage of enabling a high throughput of transactions recorded on the central public/private hybrid blockchain, or a central private permissioned blockchain, without sacrificing the immutability of the blockchain by utilizing a posting of transactions with a proof of transaction consensus before any full node consensus protocol combined with using separate single transaction blocks for each transaction such that errors can be corrected with subsequent blocks. Further, it provides the advantage of protecting against chain poisoning by implementing an anti-poisoning module that prevents poisoned blocks from being posted to the blockchain. Additionally, the system 100 provides the increased security of micro-identification chains instead of databases which are susceptible to breaches. Moreover, the system 100 provides a compliance module that automatically complies with privacy regulations for all on-boarded user PPI. Also, it provides a block explorer module that enables databases to easily be imported into the MIDC arrays. Further, the system 100 enables the users to remain in complete control of their personal data without disrupting the immutability of the notary/transaction blockchain by including a ripcord feature (to effectuate erasure or deletions) that fully de-identifies and/or anonymizes any user who wishes to discontinue using the service.

The present invention has been described in terms of specific embodiments incorporating details to facilitate the understanding of principles of construction and operation of the invention. Such reference herein to specific embodiments and details thereof is not intended to limit the scope of the claims appended hereto. It will be apparent to those skilled in the art that modification may be made in the embodiments chosen for illustration without departing from the spirit and scope of the invention. For example, in some embodiments the application includes a deadbolt function that provides real-time feedback on the smart contracts that the blockchain operating system generates as well as providing alerts on suspicious activity in order to prevent the activity from taking place. In some embodiments, the transfer of tokens and/or other moneys described herein between the operating systems/blockchains (e.g. for effectuating payments and/or issuing pre-order tokens) is effectuated used the pegged sidechains as a method of transferring the tokens between the blockchains/operating systems. As used herein, a user, buyer and/or seller is able to be any entity (e.g. person, business, fund, government entity) that is able to be due compensation on the system 100 (e.g. for a transaction and/or other feature). Specifically, even if they are not a part of the upload and/or purchase process, the entities are able to have accounts on the system such that the system is able to compensate them as necessary (e.g. as indicated in the smart contracts). Further, although the functions of the platform 102 and/or operating system 206 have been divided according to an exemplary number of modules having an exemplary subset of the functions of the platform 102, it is understood that other divisions and/or numbers of modules are contemplated (with the overall functionality of the platform 102 being the same), but omitted for the sake of brevity.

What is claimed is:

1. A zero-trust, automated, real-time privacy law and regulatory law compliance centric blockchain transaction platform for recording transactions between a plurality of users having accounts, assigned unique identifiers and assigned public and private digital key pairs on the platform, the platform comprising:
    a micro-identification blockchain array formed by a stack of a plurality of micro-identification blockchains, wherein each one of the micro-identification blockchains is dedicated to a single one of the users such that the one of the micro-identification blockchains stores a native identifier of one of the users, a coded identifier of the one of the users and a set of personal information about the one of the users;
    a notary blockchain that includes a separate single transaction block storing details of each transaction between any two or more of the users; and
    a non-transitory computer-readable medium storing at least one blockchain transaction platform operating system including a micro-identification chain engine and a notary blockchain engine, the micro-identification engine configured to:

receive a transaction request from a user device, the transaction request identifying a pending transaction object between a group of the users, wherein the pending transaction object is digitally signed by the private digital key of each user of the group;

generate and post the pending transaction object as a pending transaction block on the micro-identification chain of each user of the group of the users; and transmit the pending transaction object to the notary engine;

the notary blockchain engine configured to:
attempt to facilitate execution of terms of a transaction identified by the pending transaction object including a transfer of funds between the group of the users;

if the attempt is successful, generate and post a transaction-completed block on the notary blockchain indicating that the transaction identified by the pending transaction object is completed and transmit copies of the transaction-completed block to the micro-identification engine; and if the attempt is unsuccessful, generate a transaction-failed block indicating that the transaction identified by the pending transaction object could not be completed and transmit copies of the transaction-failed block to the micro-identification engine;

wherein the micro-identification engine is configured to post the transaction completed blocks and the transaction-failed blocks on the micro-identification blockchains of each of the group of the users upon receipt from the notary blockchain engine.

2. The blockchain transaction platform of claim 1, wherein the micro-identification engine generates each of the micro-identification blockchains by:
generating a first block of the micro-identification blockchain including the native identifier, the coded identifier and the set of personal information;
encrypting the coded identifier and the set of personal information; and
generating and appending a second block to the first block, the second block including the coded identifier and the set of personal information as encrypted.

3. The blockchain transaction platform of claim 2, wherein the notary engine is able to access blocks of the micro-identification blockchains including the coded identifier and the set of personal information as encrypted, but restricted from accessing any blocks of the micro-identification chains that include the native identifier.

4. The blockchain transaction platform of claim 1, wherein the micro-identification array is logically organized such that each of the micro-identification chains form a logical row and an initial block of each of the stack of the micro-identification blockchains form a logical first column and each subsequent block of each of the stack of the micro-identification blockchains form logical subsequent columns.

5. The blockchain transaction platform of claim 4, wherein the transaction platform operating system includes a database import module configured to import a database having stacked rows of cells of data by converting each row of the database into a new logical row of a new array formed by a new micro-identification blockchain with each cell of the row of the database forming a new block of the new micro-identification blockchain.

6. The blockchain transaction platform of claim 1, wherein the transaction platform operating system includes a data privacy compliance engine configured to:

identify a geographic location of each one of the users when the users registered with the platform and each time the users initiate a transaction on the platform;
determine a set of stored data privacy rules that apply to the geographic location; and
apply the set of data privacy rules to data added to the micro-identification blockchain of the one of the users.

7. The blockchain transaction platform of claim 6, wherein in response to the one of the users selecting a right of erasure command, the data privacy compliance engine is configured to delete the micro-identification blockchain of the one of the users.

8. The blockchain transaction platform of claim 6, wherein in response to the one of the users selecting a right of erasure command, the data privacy compliance engine is configured to:
store a time that the command was received;
determine an applicable set of the set of stored geo-locating specific data privacy rules that apply to the one of the users and if the applicable set includes an erasure delay period;
delete the micro-identification blockchain of the one of the users if the applicable set does not include the erasure delay period; and
refrain from deleting the micro-identification blockchain of the one of the users at the time that the command was received for the erasure delay period and deleting the micro-identification blockchain of the one of the users after the erasure delay period has expired if the applicable set includes the erasure delay period.

9. The blockchain transaction platform of claim 1, wherein the operating system includes an anti-poisoning module that determines if the pending transaction object includes harmful content and prevents posting of the pending transaction block if the pending transaction object includes the harmful content.

10. The blockchain transaction platform of claim 1, wherein the private digital keys are not stored on the platform and dynamically regenerated by a key module of the operating system upon request by one of the users.

11. The blockchain transaction platform of claim 1, wherein the notary blockchain engine is configured to post the transaction-completed block on the notary blockchain before consensus for the transaction has been determined, the transaction-completed block including transaction data describing the transaction.

12. A micro-identification blockchain array system for securely storing transaction data and personal information of a plurality of users having associated unique identifiers and public and private digital key pairs, the system comprising:
a micro-identification blockchain array formed by a stack of a plurality of micro-identification blockchains, wherein each one of the micro-identification blockchains is dedicated to a single one of the users such that the one of the micro-identification blockchains stores a native identifier of one of the users, a coded identifier of the one of the users and a set of personal information about the one of the users;
a non-transitory computer-readable medium storing a micro-identification blockchain engine configured to:
receive a transaction request from a user device, the transaction request identifying a pending transaction object between a group of the users, wherein the pending transaction object is digitally signed by the private digital key of each user of the group;

generate and post the pending transaction object as a pending transaction block on the micro-identification chain of each user of the group of the users;

transmit the pending transaction object to a notary blockchain engine; and post transaction completed blocks and transaction-failed blocks on the micro-identification blockchains of each of the group of the users upon receipt from the notary blockchain engine.

13. The micro-identification blockchain array system of claim 12, wherein the micro-identification engine is configured to generate each of the micro-identification blockchains by:

generating a first block of the micro-identification blockchain including the native identifier, the coded identifier and the set of personal information;

encrypting the coded identifier and the set of personal information; and generating and appending a second block to the first block, the second block including the coded identifier and the set of personal information as encrypted.

14. The micro-identification blockchain array system of claim 13, wherein the micro-identification engine enables the notary engine to access blocks of the micro-identification blockchains including the coded identifier and the set of personal information as encrypted, but restricts the notary engine from accessing any blocks of the micro-identification chains that include the native identifier.

15. The micro-identification blockchain array system of claim 12, wherein the micro-identification array is logically organized such that each of the micro-identification chains form a logical row and an initial block of each of the stack of the micro-identification blockchains form a logical first column and each subsequent block of each of the stack of the micro-identification blockchains form logical subsequent columns.

16. The micro-identification blockchain array system of claim 15, further comprising a database import module stored on the medium and configured to import a database having stacked rows of cells of data by converting each row of the database into a new logical row of a new array formed by a new micro-identification blockchain with each cell of the row of the database forming a new block of the new micro-identification blockchain.

17. The micro-identification blockchain array system of claim 12, further comprising a data privacy compliance engine stored on the medium and configured to:

identify a geographic location of each one of the users when the users registered with the platform and each time the users initiate a transaction on the platform;

determine a set of stored data privacy rules that apply to the geographic location; and apply the set of data privacy rules to data added to the micro-identification blockchain of the one of the users.

18. The micro-identification blockchain array system of claim 17, wherein in response to the one of the users selecting a right of erasure command, the data privacy compliance engine is configured to delete the micro-identification blockchain of the one of the users.

19. The micro-identification blockchain array system of claim 17, wherein in response to the one of the users selecting a right of erasure command, the data privacy compliance engine is configured to:

store a time that the command was received;

determine an applicable set of the set of stored geo-location specific data privacy rules that apply to the one of the users and if the applicable set includes an erasure delay period;

delete the micro-identification blockchain of the one of the users if the applicable set does not include the erasure delay period; and refrain from deleting the micro-identification blockchain of the one of the users at the time that the command was received for the erasure delay period and deleting the micro-identification blockchain of the one of the users after the erasure delay period has expired if the applicable set includes the erasure delay period.

20. The micro-identification blockchain array system of claim 12, further comprising an anti-poisoning module that determines if the pending transaction object includes harmful content and prevents posting of the pending transaction block if the pending transaction object includes the harmful content.

21. A method of recording transactions between a plurality of users having accounts, assigned unique identifiers and assigned public and private digital key pairs on a privacy law compliant blockchain transaction platform, the method comprising:

generating a micro-identification blockchain array with a micro-identification engine of a blockchain transaction operating system, the array formed by a stack of a plurality of micro-identification blockchains, wherein each one of the micro-identification blockchains is dedicated to a single one of the users such that the one of the micro-identification blockchains stores a native identifier of one of the users, a coded identifier of the one of the users and a set of personal information about the one of the users;

operating a notary blockchain that includes a separate single transaction block storing details of each transaction between any two or more of the users by:

receiving a transaction request from a user device with the micro-identification engine, the transaction request identifying a pending transaction object between a group of the users, wherein the pending transaction object is digitally signed by the private digital key of each user of the group;

generating and posting the pending transaction object with the micro-identification engine as a pending transaction block on the micro-identification chain of each user of the group of the users;

transmitting the pending transaction object to a notary engine of the operating system with the micro-identification engine;

attempting to facilitate execution of terms of a transaction identified by the pending transaction object including a transfer of funds between the group of the users with the notary engine;

if the attempt is successful, generating and posting a transaction-completed block on the notary blockchain with the notary engine, the transaction-completed block indicating that the transaction identified by the pending transaction object is completed and transmit copies of the transaction-completed block to the micro-identification engine;

if the attempt is unsuccessful, generating a transaction-failed block indicating that the transaction identified by the pending transaction object could not be completed and transmitting copies of the transaction-failed block to the micro-identification engine with the notary engine; and posting the transaction completed blocks and the transaction-failed blocks on the micro-identification blockchains of each of the group of the users with the micro-identification engine upon receipt from the notary blockchain engine.

22. The method of claim 21, wherein generating the micro-identification array comprises generating each of the micro-identification blockchains by:

generating a first block of the micro-identification blockchain including the native identifier, the coded identifier and the set of personal information;

encrypting the coded identifier and the set of personal information; and generating and appending a second block to the first block, the second block including the coded identifier and the set of personal information as encrypted.

23. The method of claim 22, wherein the notary engine is able to access blocks of the micro-identification blockchains including the coded identifier and the set of personal information as encrypted, but restricted from accessing any blocks of the micro-identification chains that include the native identifier.

24. The method of claim 21, wherein the micro-identification array is logically organized such that each of the micro-identification chains form a logical row and an initial block of each of the stack of the micro-identification blockchains form a logical first column and each subsequent block of each of the stack of the micro-identification blockchains form logical subsequent columns.

25. The method of claim 24, further comprising importing a database having stacked rows of cells of data with a database import module by converting each row of the database into a new logical row of a new array formed by a new micro-identification blockchain with each cell of the row of the database forming a new block of the new micro-identification blockchain.

26. The method of claim 21, further comprising with a data privacy compliance engine:

identifying a geographic location of each one of the users when the users registered with the platform and each time the users initiate a transaction on the platform;

determining a set of stored data privacy rules that apply to the geographic location; and applying the set of data privacy rules to data added to the micro-identification blockchain of the one of the users.

27. The method of claim 26, further comprising, in response to the one of the users selecting a right of erasure command, deleting the micro-identification blockchain of the one of the users with the data privacy compliance engine.

28. The method of claim 26, further comprising, in response to the one of the users selecting a right of erasure command, with the data privacy compliance engine:

storing a time that the command was received;

determining an applicable set of the set of stored geo-location specific data privacy rules that apply to the one of the users and if the applicable set includes an erasure delay period;

deleting the micro-identification blockchain of the one of the users if the applicable set does not include the erasure delay period; and refraining from deleting the micro-identification blockchain of the one of the users at the time that the command was received for the erasure delay period and deleting the micro-identification blockchain of the one of the users after the erasure delay period has expired if the applicable set includes the erasure delay period.

29. The method of claim 21, further comprising determining if the pending transaction object includes harmful content and preventing posting of the pending transaction block if the pending transaction object includes the harmful content with an anti-poisoning module.

30. The method of claim 21, wherein the private digital keys are not stored on the platform, further comprising dynamically regenerating the private digital keys with a key module upon request by one of the users.

31. The method of claim 21, wherein the posting of the transaction-completed block on the notary blockchain is performed before consensus for the transaction has been determined, the transaction-completed block including transaction data describing the transaction.

\* \* \* \* \*